United States Patent [19]

Kikugawa et al.

[11] Patent Number: 4,555,443
[45] Date of Patent: Nov. 26, 1985

[54] MAGNETIC RECORDING MEDIUM

[75] Inventors: Shozo Kikugawa; Yoshitaka Yasufuku, both of Hino, Japan

[73] Assignee: Konishiroku Photo Industry Co., Ltd., Tokyo, Japan

[21] Appl. No.: 624,097

[22] Filed: Jun. 25, 1984

[30] Foreign Application Priority Data

Jun. 30, 1983 [JP] Japan ................................ 58-118881

[51] Int. Cl.$^4$ ................................................ G11B 5/72
[52] U.S. Cl. ....................................... 428/336; 427/128; 360/134; 428/337; 428/423.7; 428/425.9; 428/447; 428/323; 428/408; 428/694; 428/695; 428/900
[58] Field of Search ............... 428/447, 336, 694, 408, 428/695, 900, 425.9, 423.7, 337, 323; 427/128; 252/62.54; 360/134–136

[56] References Cited

U.S. PATENT DOCUMENTS

| | | | |
|---|---|---|---|
| 4,091,924 | 5/1978 | Newton | 428/694 |
| 4,267,206 | 5/1981 | Johnson | 428/423.1 |
| 4,310,599 | 1/1982 | Akashi | 428/694 |
| 4,434,210 | 2/1984 | Nakajima | 428/694 |

Primary Examiner—Ellis P. Robinson
Attorney, Agent, or Firm—Jordan B. Bierman

[57] ABSTRACT

A magnetic recording medium comprising a support having a magnetic layer on a first side of said support and a back coat layer on a second side of said support, which second side is opposite said first side, said back coat layer containing at least a silicon-modified polyurethane and a carbon black having a BET value of from 200 to 500 m$^2$/g, said silicon-modified polyurethane being obtained by the reaction of an isocyanate and an active hydrogen compound having a siloxane linkage.

27 Claims, 4 Drawing Figures

MAGNETIC RECORDING MEDIUM

This application claims priority of Japanese application No. 118881/1983, filed June 30, 1983.

BACKGROUND OF THE INVENTION

1. Field of the Invention

The present invention relates to an improvement of a magnetic recording medium, and more particularly to an improvement of the backcoat layer formed on the reverse side of the support to the magnetic layer of a magnetic recording medium.

2. Description of the Prior Art

Generally, a magnetic recording medium comprises a support such as polyethylene terephthalate film and a magnetic material layer formed by coating and drying thereon a magnetic coating material obtained by mixing and dispersing a spiculate magnetic powdery material into a binder.

Such a magnetic recording medium, in the form of a magnetic tape, magnetic disk, magnetic sheet, floppy disk, or the like, is widely used in the fields of audio, video, computer, etc. Particularly, with the remarkable spread of video cassettes in these days, just as those audio cassette tapes improved on the tape thickness to be much smaller have been produced and marketed in order to meet the need for long-time recording and reproducing, the video cassette tape product also has been necessitated to be improved so thinner as to be capable of long-time picture recording and reproducing.

The factor that determines the characteristics of these magnetic recording media is, of course, the nature of the magnetic layer on the support, but that of the reverse side of the support has an important effect on the use as well as on the magnetic recording characteristics. For this reason, with the thinning of the tape, in order to reinforce its mechanical strength a backcoat layer is provided on the reverse side of the support to its magnetic layer-formed side.

For example, Japanese Patent Publication Open to Public Inspection (hereinafter referred to as Japanese Patent O.P.I. Publication) No. 176535/1982 proposes, in order to smooth the magnetic layer-forming surface of the support and the surface of the magnetic layer, to provide a backcoat layer containing silicon-modified polyurethane on the reverse side of the support.

However, the backcoat layer consisting of a binder alone is disadvantageous because it has as large a surface electric resistance as to cause static electricity during the running of the tape to adsorb dust to increase dropout, and also has the disadvantage that the backcoat layer and the magnetic layer, during the storage of the tape wound in the reel form, tend to stick to each other. And if the surface of the magnetic layer is treated to be smooth like a mirror, the contacting area between the tape surface or between the tape and other objects such as guide rods becomes wider.

Thus, the frictional resistance increases, and therefore the run of the tape becomes unstable (because, during the running, the tape comes into contact with guide rollers or becomes elongatively deformed.).

To solve the problem of such running instability resulting from the surface smoothing of the magnetic layer, attempts are made to roughen the surface of the backcoat layer by use of a binder containing carbon black, titanium oxide powdery material, or the like, but any satisfactory running stability and electromagnetic conversion characteristic are still not obtained. If a backcoat layer is formed by the above method, the pattern of the roughened surface of the backcoat layer is transferred onto the smooth surface of the magnetic layer at the time of winding the tape, the surface smoothness of the magnetic layer is reduced, and the electromagnetic conversion characteristic, chroma S/N and video S/N are deteriorated.

Further, the electromagnetic recording medium, if the surface roughness of the backcoat layer is not appropriate, can cause cinching or loosening trouble (a reel cinching or loosening phenomenon caused when the tape abruptly stops).

In order to solve the disadvantageous problem of the above-mentioned transfer of the pattern of the rough surface of the backcoat layer formed by use of a binder containing such a powdery material as carbon black, titanium oxide, etc., onto the smooth surface of the magnetic layer at the time of tape winding, Japanese Patent O.P.I. Publication No. 150133/1982 proposes the incorporation of as lubricants a fluorine compound, alkoxysilane, and silane fluoride into the backcoat layer.

However, the incorporation of such low-molecular lubricants into the backcoat layer often causes the lubricants to deposit, depending on the kinds or adding quantities thereof or due to the change in environmental conditions, so that a bleed-out phenomenon tends to occur on the surface of the backcoat layer and causes the magnetic layer and backcoat layer to stick to each other.

For solution to the problem of the above-described transfer of the pattern of the surface roughness of the backcoat layer resulting from the incorporation of such a powdery material as carbon black, titanium oxide, etc., onto the surface of the magnetic layer, Japanese Patent O.P.I. Publication No. 208636/1982 proposes the selection of an appropriate graininess and content range of such a nonmagnetic powdery material as carbon black, titanium oxide, etc., to be contained in the backcoat layer and the dispersion of such a powdery material into a binder comprised of nitrocellulose, vinyl chloride-vinyl acetate copolymer, polyurethane, and isocyanate compound.

These methods using a nonmagnetic powdery material and lubricants in the backcoat layer can surely reduce the foregoing disadvantages to a considerable extent due to their synergistic effect, but the characteristic (such as coefficient of friction) of the binder itself is not satisfactory for the running stability, so that they are not yet considered sufficient as the characteristic necessary for the backcoat layer.

In view of the above conditions, as a result of our investigation made with respect to a magnetic recording medium comprising a support having on one side thereof a magnetic layer and on the other a backcoat layer, it has now been found that:

(a) the method of incorporating nonmagnetic powdery matereals into the backcoat layer will not display its effects (reinforcement of the tape, removal of the winding disarray resulting from insufficient ejection of the air involved in between tape winds at the time of high-speed tape winding, prevention of permanent deformation resulting from the winding disarray, prevention of dropout and the lowering of S/N) unless the surface is appropriately coarsely roughed, (b) if the surface of the backcoat layer is sufficiently roughed, the pattern of the rough surface is transferred onto the surface of the magnetic layer, thus deteriorating the characteristics of the tape, and (c) silicon-modified polyurethane in itself has lubricity, and the incorporation of it along with nonmagnetic powdery materials and particularly with an appropriate BET value-having carbon black into the backcoat layer can maintain the surface of the backcoat layer comparatively flat and smooth, reducing the transfer of the pattern onto the magnetic layer, and enables the backcoat layer to retain its appropriate roughness, thus preventing possible winding disarray of the tape at the time of reel winding, and further the incorporation of the polyurethane lowers the surface resistance of the backcoat layer to thereby prevent the adsorption of dust by the accumulation of static electricity, and also lowers the light transmittance of the tape, so that the adding quantity of carbon black to the magnetic layer can be reduced, the mechanical-physical properties can be improved, and the sticking between the backcoat and magnetic layers can be prevented.

Thus, we have reached the present invention.

SUMMARY OF THE INVENTION

Objects of the Invention

It is an object of the present invention to provide a magnetic recording medium comprising a support having on one side thereof a magnetic layer and on the other a backcoat layer, the layers' surface having an appropriate lubricity, the magnetic recording medium being improved so that, in, e.g., a magnetic recording medium in the tape form, the reel-wound condition of the recording medium tape (i.e., wound appearance) is good, and the possibility of permanent deformation by tape winding disarray is reduced.

It is another object of the present invention to provide a magnetic recording medium which causes little or no dropout, which is excellent in the S/N ratio, which hardly accumulates static electricity, and which hardly causes sticking trouble between the magnetic and backcoat layers.

DETAILED DESCRIPTION OF THE INVENTION

Figure 1:
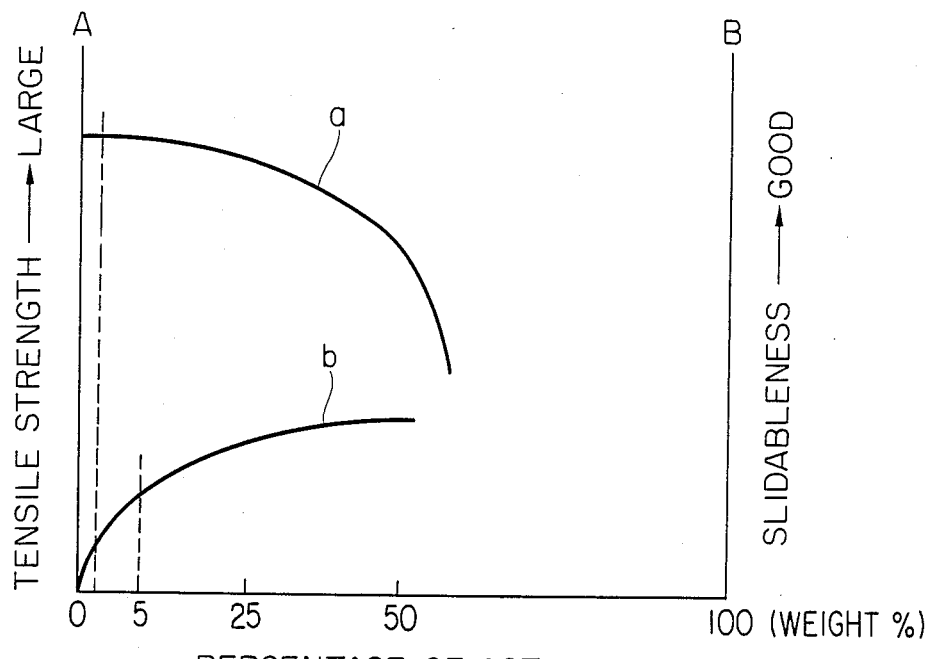
FIG. 1 is a graph showing characteristic curves representing the relations between the tensile strength, lubricity, and the percentage by weight of a siloxane linkage-having active hydrogen compound contained in the silicon-modified polyurethane.

The above objects of the present invention, in a magnetic recording medium comprising a support having on one side thereof a magnetic layer and on the reverse side thereof to the magnetic layer a backcoat layer, can be accomplished by incorporating into the backcoat layer at least silicon-modified polyurethane and carbon black having a BET value of 200-500 m²/g. The BET value is hereinafter also called "specific surface".

The silicon-modified polyurethane to be used for the backcoat layer of the magnetic recording medium of the present invention should be a polymer obtained by the reaction of an isocyanate with an active hydrogen compound having at least one siloxane linkage, for example, a polysiloxane having the following formula:

$$\text{HO}-\text{R}\underset{Y^2}{\overset{Y^1}{-}}\text{Si}-\text{O}\underset{Y^2}{)_n}\overset{Y^2}{\underset{\phantom{Y^2}}{\text{Si}}}-\text{R}-\text{OH} \quad [I]$$

wherein R is an alkylene radical having from 1 to 20 carbon atoms, $Y^1$ and $Y^2$ each is an alkyl or aryl radical, the $Y^1$ and $Y^2$ being allowed to be the same as or different from each other, and n, the average molecular weight of those having Formula [I], is an actual number of from 150 to 10,000. The preferred one is polydimethyl-siloxane diol.

The $Y^1$ and $Y^2$ each is preferably methyl or phenyl group, and most preferably methyl group.

The alkylene radical (R) having from 1 to 20 carbon atoms in Formula [I] includes methylene, ethylene, propylene, butylene, hexylene, octylene, dodecylene, and the like. The preferrd molecular weight range of those polysiloxanedicarbinol having Formula [I] is from 500 to 10,000, and paticularly preferably from 1,000 to 6,000.

Alternatively, there may also be used those compounds wherein part of the methyl radicals particularly preferred as the $Y^1$ and $Y^2$ is substituted by one or not less than two radicals selected from the group consisting of 2-30 carbon atoms having alkyl, haloalkyl, cyanoalkyl, arylalkyl, vinyl, alkenyl such as acryl, aryl, alkylaryl, alkenylaryl, and haloaryl radicals, or by hydrogen or a halogen.

The foregoing isocyanate includes those as given in Table 1.

TABLE 1

| No. | Compound |
|-----|----------|
| (1) | Hexamethylene-diisocyanate<br>$OCN(CH_2)_6NCO$<br>e.g., "Desmodur H," manufactured by Nippon Polyurethane |
| (2) | 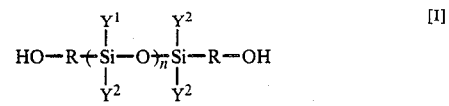<br>e.g., "Desmodur N," manufactured by Nippon Polyurethane |
| (3) | meta-phenylene-diisocyanate<br>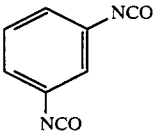 |
| (4) | Toluylene-diisocyanate<br>A mixture of<br>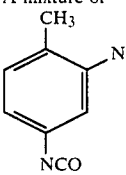 |

TABLE 1-continued

| No. | Compound |
|---|---|
| | e.g., "Desmodur T," manufactured by Nippon Polyurethane, and "Hylem TM," by Du Pont |
| (5) | 2,4-tolylene-diisocyanate (structure shown)

e.g., "Desmodur TT," manufactured by Nippon Polyurethane |
| (6) | The reaction product of toluylene-isocyanate with trimethylolpropane (structure shown)

e.g., "Colonate L," manufactured by Nippon Polyurethane |
| (7) | 3,3'-dimethyl-diphenyl-4,4'-diisocyanate (structure shown)

e.g., "Hylen H," manufactured by Du Pont |
| (8) | Diphenylmethane-4,4'-diisocyanate (structure shown)

e.g., "Millionate MT", manufactured by Nippon Polyurethane |
| (9) | 3,3'-dimethyl-diphenylmethane-4,4'-diisocyanate (structure shown)

e.g., "Hylen DDM," manufactured by Du Pont |
| (10) | Triphenylmethane-triisocyanate (structure shown)

e.g., "Desmodur R," manufactured by Nippon Polyurethane |
| (11) | Polymethylenephenyl-isocyanate (structure shown)

e.g., "Millionate MR," manufactured by Nippon Polyurethane |
| (12) | Naphthalene-1,5-diisocyanate (structure shown) |
| (13) | Isophorone-diisocyanate (structure shown) |
| (14) | o-Xylilene diisocyanate (structure shown) |
| (15) | Dicyclohexyl-diisocyanate (structure shown) |
| (16) | Hydrogenated xylilene diisocyanate (structure shown) |
| (17) | Lysine-diisocyanate
OCN─(CH$_2$)$_4$─CH─NCO
                            │
                            CO$_2$CH$_3$ |
| (18) | Urethane prepolymer
e.g., the product under the trade name:
"Olester M-55," containing 3% ─NCO
"Olester P-49-75X," containing 12% ─NCO
manufactured by Toyo Ko-atsu Ind. Co., Ltd. |
| (19) | Polyester-urethane prepolymer
e.g., the product under the trade name:
"Adiprene L-100," containing 4% ─NCO
manufactured by Du Pont |
| (20) | Polyether-urethane prepolymer
e.g., the product under the trade name:
"Adiprene CD-123," containing 9% ─NCO
manufactured by Du Pont |

These isocyanates may be used alone or in combination of two or more of them.

As the active hydrogen compound for use in the reaction with the isocyanate, a polyol may be used in addition to the foregoing polysiloxane diol.

The polyol includes known polyether diols, polyester diols, polycarbonate diols, and the like.

The polyether diol includes those obtained by the addition reaction of one or not less than two of such alkylene oxides as, e.g., ethylene oxide, propylene oxide, butylene oxide, tetrahydrofuran, styrene oxide, and the like, (hereinafter merely called alkylene oxide) with such compounds as, e.g., water, ethylene glycol, diethylene glycol, propylene glycol, dipropylene glycol, 1,3- or 1,4-butylene glycol, 1,6-hexamethylene glycol, bisphenol A, and the like.

The polyester diol includes, for example, those polyester diols obtained by the reaction of one or two or more of, e.g., ethylene glycol, diethylene glycol, propylene glycol, dipropylene glycol, trimethylene glycol, 1,3- or 1,4-butylene glycol, neopentyl glycol, 1,6-hexamethylene glycol, decamethylene glycol, bisphenol A, bisphenol F, p-xylilene glycol, 1,4-cyclohexane diol, 1,4-cyclohexane-dimethanol, or alkylene-oxide addition products of these compounds with one or two or more of malonic acid, maleic acid, succinic acid, adipic acid, glutaric acid, pimelic acid, sebacic acid, oxalic acid, phthalic acid, isophthalic acid, terephthalic acid, hexahydrophthalic acid, and the like; those diols obtained by the ring-opening polymerization of such cyclic esters as propiolactones, butyrolactones, caprolactones, and the like; and those polyester diols produced from some of the above glycols and cyclic esters or from some of the above glycols, dibasic acids, and cyclic esters.

The polycarbonate diol includes those compounds having the formula:

$$H-O-R-OCO_nROH \quad (n \geq 1)$$

wherein R is a glycol or the residue of a dihydric phenol.

The glycol or dihydric phenol includes, e.g., trimethylene glycol, diethylene glycol, 1,3- or 1,4-butylene glycol, 1,6-hexamethylene glycol, decamethylene glycol, p-xylilene glycol, bisphenol A [2,2-bis(4'-hydroxyphenyl)propane], bisphenol F (4,4'-dihydroxydiphenylmethane), and the like.

In addition, 1,2-polybutadiene diol, 1,4-polybutadiene diol, polychloroprene diol, butadiene-acrylonitrile copolymer diol, and the like, may also be used.

These polyols may be used alone or in combination of not less than two kinds when used along with the foregoing polysiloxane diol.

Further, as the foregoing active hydrogen compound, in addition to the above-mentioned polysiloxane diols and the above diols there may also be used in combination low-molecular-weight compounds (having average molecular weight of preferably not more than 500) as chain elongating agents.

The chain-elongating agent includes those known aliphatic diols, aromatic diols, N-alkyl- or N-aryl-dialkanolamines, aliphatic diamines, aromatic diamines, and the like.

The aliphatic diol includes, for example, ethylene glycol, propylene glycol, 1,3- or 1,4-butylene glycol, 1,5-penta-diol, 1,6-hexamethylene glycol, neopentyl glycol, 2-ethyl-1,3-hexane-diol, 2,2,4-trimethyl-1,3-pentane-diol, 2,2,4- or 2,4,4-trimethyl-1,6-hexane-diol, decamethylene glycol, 1,4-cyclohexane-diol, 1,4-cyclohexane-dimethanol, 2,2-bis(4'-hydroxycyclohexyl)propane, 3-methyl-1,3-butane-diol, p-xylilene-glycol, and alkylene-oxide addition products of these compounds.

The above aromatic diols include, for example, hydroquinone, bisphenol A, bisphenol F, naphthylene diol, and alkylene-oxide addition products of these compounds.

The N-alkyl- or N-aryl-dialkanolamines include, e.g., methyl-diethanolamine, methyl-diisopropanolamine, ethyl-diethanolamine, phenyl-diethanolamine, m-tolyl-diethanolamine, and alkylene-oxide addition products of these compounds.

The aliphatic diamines include, e.g., ethylenediamine, hexamethylenediamine, isophoronediamine, 1,3-bis-(aminomethyl)cyclohexane, polyoxypropylenediamine, bis(p-aminocyclohexyl)methane. The aromatic diamines include, e.g., meta-xylenediamine, tolylenediamine, diphenylmethanediamine, 4,4'-methylene-bis(2-chloroaniline), 1,5-naphthylenediamine.

These chain-elongating agents(C) may be used alone or in combination of not less than two kinds.

The foregoing silicon-modified polyurethanes may be cross-linked polymers, and those cross-linking agents usable therefor include prior-art polyols, polyamines, alkanolamines, and the like.

The above polyols usable include, for example, trimethylolpropane, glycerol, 3-methylpentane-1,3,5-triol, pentaerythritol, sorbitol, sucrose, polyglycerol, tris(β-hydroxyethyl)isocyanurate; alkylene-oxide addition products of these polyols; ε-caprolactone addition products of these polyols; and polyester polyols; and the like.

The above polyamines include, for example, ethylenediamine, diethylenetriamine, tolylenediamine, diphenylmethanediamine, isophoronediamine, 4,4'-methylene-bis(2-chloroaniline), hexamethylenediamine, 1,3-bis(aminomethyl)cyclohexane, polyoxypropylenediamine, bis(p-aminocyclohexyl)methane, meta-xylenediamine, and the like.

The above alkanolamines include, for example, monomethanolamine, diethanolamine, triethanolamine, monoisopropanolamine, diisopropanolamine, triisopropanolamine, and alkylene-oxide addition products of these polyamines.

These cross-linking agents may be used alone or in combination of not less than two kinds.

Further, for the foregoing silicon-modified polyurethane, those reaction stop agents containing one or more active hydrogen radicals may be used.

Those usable reaction stop agents include monoalcohols such as isopropanol, n-butanol, sec-butanol, t-butanol, etc.; glycols such as ethylene glycol, propylene glycol, etc.; triols such as glycerol, trimethylolpropane, etc.; amines such as dimethylamine, ethylpropylamine, dibutylamine, etc.; alkanolamines such as diethanolamine, triethanolamine, etc.; oximes such as acetoxime, methyl-ethyl ketoxime, etc.; lactams such as γ-butyrolactam, ε-caprolactam, etc.; silane coupling agents such as N-β-(aminoethyl)-γ-aminopropyltrimethoxysilane, N-β-(aminoethyl)-γ-aminopropyltriethoxysilane, γ-aminopropyltriethoxysilane, γ-mercaptopropyltrimethoxysilane, etc.; and the like. The using quantity of these reaction stop agents may be within the range of from 0.01 to 0.2 mole per mole of the foregoing isocyanates.

The preferred silicon-modified polyurethanes are: (1) in the case of silicon-modified polyurethane produced from the foregoing polysiloxane diols (allowed to be in combination with the foregoing high-molecular diols) and isocyanates, those produced using the number of the isocyanate radicals and the total number of the active hydrogen radicals of the polysiloxane diol (allowed to be in combination with the foregoing high-molecular diol) in a proportion of 0.85–1.1 to 1, and (2) in the case of using at need the foregoing chain-elongating agents and further the foregoing cross-linking agents, those produced using the number of the isocyanate radicals and the total number of the active hydrogen radicals of the foregoing polysiloxane diol (allowed to be in combination with the foregoing high-molecular diol) and the chain-elongating agent or of the foregoing siloxane diol (allowed to be in combination with the foregoing high-molecular diol) and the foregoing cross-linking agent in a proportion of 0.85–1.1 to 1.

In the above (1) or (2), if the proportion of the number of the isocyanate radicals to the total number of the active hydrogen radicals is not more than 0.85 to 1 or not less than 1.1 to 1, the mechanical-physical properties of the silicon-modified polyurethane can be deteriorated, and, if used for the backcoat layer, can make the run of the tape unstable.

The average molecular weight of the thus obtained silicon-modified polyurethane is important when used in coating a backcoat layer and desirable to be in the range of from 5,000 to 200,000. If the average molecular weight is less than 5,000, the polyurethane tends to cause exudation or sticking trouble after the formation of a backcoat layer. If the average molecular weight is more than 200,000, the viscosity of the polyurethane becomes so high that the coating of it is hardly made uniformly.

Among these polyurethanes, preferred are those in which the siloxane linkage-having active hydrogen compound content (e.g., siloxane linkage-having glycol content) of the part formed by the active hydrogen compound (e.g., polyol, polyolpolyester, glycol components, etc.) that reacts with the isocyanate is in the range of from 1 to 50% by weight, and the most preferred are those of from 5 to 25% by weight. In the siloxane linkage-having active hydrogen compound content ratio is less than 1% by weight, the resulting recording medium becomes lacking in lubricity, and if the content ratio exceeds 50% by weight, the layer strength (e.g., tensile strength) of the resulting recording medium could be deteriorated. The embodiment of this is given in FIG. 1. In FIG. 1, the axis of abscissa represents percentage by weight of the siloxane linkage-having active hydrogen compound in the silicon-modified polyurethane. Of the axes of ordinate, Axis A represents the tensile strength of the polyurethane, while Axis B represents the lubricity of the resulting magnetic recording medium.

As apparent from FIG. 1, if the ratio of the siloxane linkage-having active hydrogen compound content of the silicon-modified polyurethane is less than 1% by weight, the resulting magnetic recording medium could become lacking in lubricity, while if the ratio exceeds 50% by weight, the layer strength (e.g., tensile strength) of the resulting magnetic recording medium could be deteriorated.

The mechanical strength, determined in accordance with the test method specified in the Japanese Industrial Standard JISK6301, of the silicon-modified polyurethane usable for the backcoat layer of the magnetic recording medium of the present invention is as follows:

Elongation: 2–1,000%
Tensile strength: 10–650 kg/cm$^2$

As will be described hereinafter, the coefficient of friction on the backcoat layer side of the resulting magnetic recording medium is preferably from 0.19 to 0.30, on condition that the determination of the coefficient of friction is made in the manner that the magnetic layer side is brought into contact with and wound 180° around a stainless steel-made fixed pin having a diameter of 4 mm; the tensile force on the inlet side is maintained to be 50 g with respect to the fixed pin; the tensil force on the outlet side at a tape running rate of 3.3 cm/second was measured; and then a coefficient of friction $\mu$ was found from the following formula:

$$\mu = \frac{1}{\pi} \ln \frac{\text{outlet-side tensile force}}{\text{inlet-side tensile force}}$$

The silicon-modified polyurethane, since it shows a much smaller coefficient of friction than that of ordinary polyurethanes, can be used alone without using any binder. However, the silicon-modified polyurethane, because it is soft, when stored in a reel form, tends to often cause a trouble of sticking between its backcoat and magnetic layers. For this reason, the polyurethane is desirable to be used in combination with a different binder harder than the same. Further, the combined use of an appropriate powdery material prevents the sticking more effectively.

The mixing ratio by weight of the different binder/silicon-modified polyurethane is desirable to be within the range of from 75/25 to 25/75.

If the mixing ratio of the different binder exceeds 75/25, the backcoat layer's adherence to the support becomes deteriorated, causing exfoliation or scrape-off phenomenon, resulting in the increase in dropout.

In contrast to this, if the silicon-modified polyurethane exceeds 25/75, the backcoat layer becomes "sticky38 and, when stored in a reel form, often causes sticking between the backcoat and magnetic layers.

These relations will be given in Table 2, taking the case of a partially hydrolyzed vinyl chloride-vinyl acetate copolymer (e.g., "VAGH,38 a product of Union Carbide) as the above-mentioned different binder.

TABLE 2

| Silicon-modified polyurethane content (%) | VAGH content (%) | Stickiness with the magnetic layer | Adherence between the backcoat layer and support |
|---|---|---|---|
| 100 | 0 | Sticking can occur | Good |
| 85 | 15 | Sticking can partially occur | " |
| 75 | 25 | No sticking occurs | " |
| 60 | 40 | " | " |
| 40 | 60 | " | " |
| 25 | 75 | " | " |
| 15 | 85 | " | Normal |
| 0 | 100 | " | Good |

In Table 2, in regard to the stickiness between the magnetic and backcoat layers, judgement by eye was made on a test sample prepared in the manner that a one-meter-long piece of the magnetic recording medium (tape) wound up, hanging a load of 1.5 kg, around a glass tube having a diameter of 36 mm was allowed to stand under an atmospheric condition of a temperature of 45° C. with a relative humidity of 80% for four hours, and then allowed to stand at room temperature over a period of 24 hours.

In regard to the adherence between the backcoat layer and support, judgement by eye was made on the peeling degree of the backcoat layer from the support when a cellophane tape applied under a given pressure onto the surface of the backcoat layer was stripped off by pulling with a given force in the perpendicular direction.

In the backcoat layer of the present invention, as the binder, in addition to the above silicon-modified polyurethane, if, for example, a cellulose-type resin and/or a vinyl chloride-type copolymer, or a polyester-type resin is incorporated into the backcoat layer, the sticking thereof with the magnetic layer can be prevented. Although the use of the cellulose-type resin and/or vinyl chloride-type copolymer alone causes the backcoat layer to become too hard, this hardness can be moderated by the incorporation of the above silicon-modified polyurethane.

The above usable cellulose-type resins include cellulose ethers, celluose inorganic acid esters, cellulose organic acid esters, and the like. Ihe cellulose ethers include methyl cellulose, ethyl cellulose, propyl cellulose, isopropyl cellulose, butyl cellulose, methyl-ethyl cellulose, methylhydroxyethyl cellulose, ethylhydroxyethyl cellulose, carboxymethyl cellulose, carboxymethyl cellulose sodium salt, hydroxyethyl cellulose, benzyl cellulose, cyanoethyl cellulose, vinyl cellulose, nitrocarboxymethyl cellulose, diethylaminoethyl cellulose, aminoethyl cellulose, and the like. The cellulose inorganic acid esters include nitrocellulose, cellulose sulfate, cellulose phosphate, and the like. The cellulose organic acid esters include acetyl cellulose, propionyl cellulose, butyryl cellulose, methacryloyl cellulose, chloroacetyl cellulose, $\beta$-oxypropionyl cellulose, benzoyl cellulose, cellulose p-toluenesulfonate, acetylpropionyl cellulose, acetyl-butyryl cellulose, and the like. The preferred among these cellulose-type resins is nitrocellulose. Typical product examples of nitrocellulose include "Celnova BTH ½" and "Nitrocellulose SL-1" produced by Asahi Chemical Industry Co., Ltd., and "Nitrocellulose RS ¼" by Daicell Co., Ltd. The viscosity of nitrocellulose (specified in JIS K-6703 (1975)) should be preferably from 2 to 1/64 sec., and particularly one having a viscosity of from 2 to ½ sec. is excellent. Those outside the range reduces the layer strength of the backcoat layer.

The above-mentioned vinyl chloride-type copolymers usable in the present invention include those having the formula:

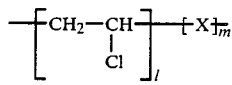

wherein the molar ratio derived from the l for the unit

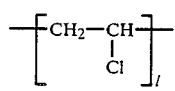

and the m for the unit $[X]_m$ is 95–50 mole % for the former unit and 5–50 mole % for the latter unit; X represents the monomer residue copolymerizable with vinyl chloride and represents at least one selected from the group consisting of vinyl acetate, vinyl alcohol, maleic anhydride, maleic acid, maleates, vinylidene chloride, acrylonitrile, acrylic acid, acrylates, methacrylic acid, methacrylates, vinyl propionate, glycidyl methacrylate, and glycidyl acrylate. The polymerization degree represented by the (l+m) is preferably from 100 to 600. If the polymerization degree is less than 100, the backcoat layer tends to become sticky, while if the degree exceeds 600, the dispersibility of nonmagnetic powdery materials becomes worse. The above vinyl chloride-type copolymers may be partially hydrolyzed. Preferred as the vinyl chloride-type copolymers are those copolymers containing vinyl chloride-vinyl acetate components (hereinafter referred to as "vinyl chloride-vinyl acetate-type copolymer"). Examples of the vinyl chloride-vinyl acetate-type copolymers include vinyl chloride-vinyl acetate-vinyl alcohol copolymer, vinyl chloride-vinyl acetate-maleic anhydride copolymer, vinyl chloride-vinyl acetate-vinyl alcohol-maleic anhydride copolymer, vinyl chloride-vinyl acetate-vinyl alcohol-maleic anhydride-maleic acid copolymer. Among these vinyl chloride-vinyl acetate-type copolymers, those hydrolyzed copolymers are preferred. As product examples of the above vinyl chloride-vinyl acetate-type copolymers, "VAGH," "VYHH" and "VMCH" produced by Union Carbide; "S-lec A," "S-lec A-5," "S-lec C" and "S-lec M" produced by Sekisui Chemical Co., Ltd.; "Denkavinyl 1000G" and "Denkavinyl 1000W" produced by Denki Kagaku Kogyo K. K.; and the like, may be used.

When the above vinyl chloride-type copolymer and the foregoing cellulose-type resin are used in combination, although they may be used in an arbitrary proportion, the proportion by weight of the vinyl chloride-type resin to the cellulose-type resin is preferably from 90/10 to 5/95, and more preferably from 80/20 to 10/90. If the cellulose-type resin content is larger exceeding the range (the above ratio by weight is less than 5/95), the backcoat layer of the resulting magnetic recording medium is too hardened, deteriorating its durability, and on the other hand if the vinyl chloride-type copolymer content is larger, it can deteriorate the adherence of the layer to the support.

With regard to the whole binder components of the backcoat layer, the proportion by weight of the above silicon-modified polyurethane to different resins (cellulose-type resins, vinyl chloride-type copolymers, polyester resins, etc.) should be in the range of preferably from 75/25 to 25/75, and particularly preferably from 60/40 to 40/60. A preferred embodiment is the use of the silicon-modified polyurethane in combination with the cellulose-type resin and vinyl chloride-type copolymer.

Figure 2:
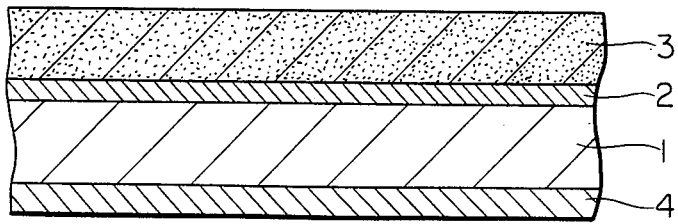
FIG. 2 is a cross-sectional view of the magnetic recording medium of the present invention, wherein 1 is a support, 2 is a subbing layer (if necessary), 3 is a magnetic layer, and 4 is a backcoat layer.

FIG. 2 shows a cross-sectional view of the magnetic recording medium (e.g., magnetic tape) of the present invention, which comprises a support 1 having on one side thereof in order a subbing layer 2 (or may be excluded) and a magnetic layer 3 and on the other side thereof a backcoat layer 4. Subbing layer 2, which, if necessary, is provided, may use any of various binders, coupling agent, titanium coupling agent, and the like.

The surface electric resistance of the backcoat layer needs to be as low as normally not more than $10^{10}$ $\Omega$.cm, and preferably not more than $10^8$ $\Omega$.cm.

If the electric resistance is higher than this, the frictional static electricity charged when the tape runs adsorbs dust to cause a dropout trouble, and also the electrostatic attraction increases the tension of the tape while running, thus making the appearance of the tape awkward.

The surface electric resistance (also called surface resistivity) of many backcoat layers comprised of a binder alone becomes usually more than $10^{11}$, causing various electrostatic troubles. The same thing is true to the backcoat layer using the silicon-modified polyurethane of the present invention, so that, in order to effectively reduce the electric resistance of the backcoat layer, it is desirable to add to the layer a carbon black having the following BET value:

$$200 \text{ m}^2/\text{g} \leq B < 500 \text{ m}^2/\text{g}$$

The specific surface B (BET value) specified as above is very important. That is, if Specific Surface B of carbon black is less than 200 m²/g, its particle size becomes so large that, even when the carbon black is added, the conductivity becomes remarkably insufficient, while if Specific Surface B exceeds 500 m²/g, although the conductivity is satisfactory, the particle size is so small that, on the contrary, the carbon black becomes unable to be dispersed sufficiently, causing the surface of the backcoat layer to be coarse. The carbon black functions to prevent the transmission of light through the tape. In the VHS system, the control of the tape run is made through the detection of a light transmittance. For this reason, carbon black is usually added to the magnetic layer for the light-shield purpose. Accordingly, the addition of carbon black to the backcoat layer allows the reduction of the adding quantity of carbon black to the magnetic layer, leading to the improvement on the durability of the magnetic layer.

The present invention relates to a magnetic recording medium which is improved with respect to the running stability, reel-winding characteristics, S/N ratio, dropout and stickiness between the magnetic and backcoat layers by providing on the reverse side of the support a backcoat layer containing a silicon-modified polyurethane which in itself has a low coefficient of friction in combination with carbon black having the foregoing BET value.

The surface of the backcoat layer is usually roughened by adding a nonmagnetic powdery material to the layer for the purpose of improving its running stability and reel-wound appearance. In order to increase this effect, a large amount of the nonmagnetic powdery material needs to be used to considerably roughen the surface.

The coarse roughness of the backcoat layer is transferred onto and roughen the surface of the magnetic layer to deteriorate the characteristics of the resulting tape.

The silicon-modified polyurethane, since its own coefficient of friction is low, even if a glossy surface is formed, can provide a low-coefficient-of-friction backcoat layer, thus stabilizing the tape run. If, however, the tape is wound up particularly at a rapid speed, the air involved in between the glossy magnetic layer and glossy backcoat layer is not ejected sufficiently, thus disarraying the side faces of the wound-up tape reel. If the tape is stored in such a disarrayed appearance, the tape edge becomes deformed during the storage, thereby deteriorating largely the tape characteristics.

The method for reducing coefficient of friction by roughening the surface will not display its effect unless the surface is made considerably coarse. If, therefore, the surface is so roughened, the roughness of the surface of the backcoat layer is transferred onto the magnetic layer to reduce its surface smoothness to thereby invite the deterioration of its S/N ratio and increase in a dropout trouble. There also is a method for keeping the surface of the backcoat layer smooth as much as possible by the combined use of a low-molecular lubricant in the backcoat layer to reduce the coefficient of friction of the layer itself, but the method has the disadvantage that the low-molecular lubricant exudes and deposits on the surface, and also tends to cause a trouble of sticking between the backcoat and magnetic layers.

Since the present invention uses a binder which in itself has a low coefficient of friction, even if a smooth or glossy surface-having backcoat layer is formed, the resulting tape can run satisfactorily. Giving to the surface as slight roughness as necessary to eject the air that is involved at the time of rapid winding in between the layers is enough, so that the surface of the backcoat layer of the present invention is much smooth as compared to other conventional backcoat layers using a binder having a high coefficient of friction. Therefore, the surface smoothness of the magnetic layer will never be deteriorated.

The backcoat layer may be provided on a support before coating a magnetic layer or after providing the magnetic layer and making a surface treatment or simultaneously with the magnetic layer.

If the backcoat layer is coated prior to the magnetic layer, and if the magnetic layer is coated after the backcoat layer is sufficiently hardened, then a sticking trouble between the backcoat and magnetic layers can be lessened.

The procedure of coating the backcoat layer after coating and sufficiently drying of the magnetic layer is advantageous in respect that the roughness pattern of the backcoat layer is hardly transferred onto the magnetic layer because the magnetic layer is already hardened.

Thichness of the backcoat layer is preferably from 0.1 to 5μ, and more preferably from 0.5 to 2μ. If the thickness is not more than 0.1μ, the backcoat layer cannot provide any sufficient surface roughness, so that the running stability of the tape is not improved, the foregoing carbon black cannot be sufficiently added, and the surface resistance is not lowered. If the thickness exceeds 5μ, since the overall tape reel thickness is strictly restricted under the necessity of loading a given length of the tape into a given capacity-having cassette, the thickness of the magnetic layer is compelled to be largely reduced, so that, in the case of a video tape, the audio sensitivity becomes largely deteriorated.

As has been previously mentioned, the specific surface of carbon black is desirable to be from 200 to 500 m²/g.

BET value (specific surface) means the surface area per unit weight, a physical value quite different from the average particle size; i.e., for example, there can exist different ones having a large specific surface and a small specific surface even if they are the same in respect of their average particle size. The measurement of the specific surface is made in the procedure that a powdery carbon black is heat-treated at about 250° C. for 30-60 minutes for degassing to eject those adsorbed in the powder, and then conducted into a measuring instrument, in which the initial nitrogen pressure is set to be 0.5 kg/m², and an adsorption measurement is carried out with the nitrogen at a liquid nitrogen temperature of −195° C. (the method for measuring specific surface, which is generally called BET method: For details see J. Ame. Chem. Soc., 60, 309 (1938)).

For this measurement of specific surface (BET value), there may be used a powdery particle material measuring instrument "Quantasorb" jointly manufactured by Yuasa Battery Co., Ltd. and Yuasa Ionics Co., Ltd. General descriptions about specific surface and the measuring method therefor are detailed in the "Measurement of Powdery Materials" (by J. M. Dallavalle and Clyde Orr; translated into Japanese by Benda et al.; published by Sangyo Tosho Publishing Co.), and also described in the "Kagaku Benran (Handbook of Chemistry)" (the Application Section, 1170-1171, compiled by the Chemical Society, Japan; published by Maruzen Co., Ltd. on April 30, 1966).

Referring more in detail to the addition effect of carbon black, carbon black, as has been mentioned, is added for the purpose of reducing the surface resistivity (surface electric resistance) and the coefficient of friction of the backcoat layer and the light transmittance of the tape, but if the adding quantity of carbon black is increased, it deteriorates significantly the mechanical characteristic of the layer, so that carbon black needs to be added in a quantity of normally from 5 to 35% by weight (preferably from 10 to 25% by weight) to the binder used. In the present invention there is no need of increasing the adding quantity of carbon black, exceeding the foregoing specific surface range, so that the quantity may be settled in the range of from 5 to 35% by weight, thus enabling not only to keep the mechanical characteristic (e.g., exfoliation of the backcoat layer) of the layer satisfactory but to obtain a desired surface resistivity (in a order of not more than $10^9$ $\Omega$.cm) and a desired light transmittance (not more than 0.05%).

On the other hand, a conductive carbon black whose BET value is extremely high (BET value of larger than 500 m$^2$/g) may, when containing the same weight of carbon black, be advantageous in respect that the surface resistivity and light transmittance of the layer are improved, but on the contrary its dispersion into the layer becomes difficult, causing a coarse surface due to the insufficient dispersion, appearance of pinholes, and the like, leading to making the tape run unstable, the increase in the surface resistivity and light transmittance, and the deterioration of the electromagnetic conversion characteristic of the resulting tape. In this instance, if a less-dispersible carbon black is used, it is often not dispersed sufficiently, causing dissociation of the carbon black in the coating liquid, coarse surface of the layer, appearance of pinholes, and the like, but these can be prevented effectively by the application of the BET value range of from 200 to 500 m$^2$/g.

Figure 3:
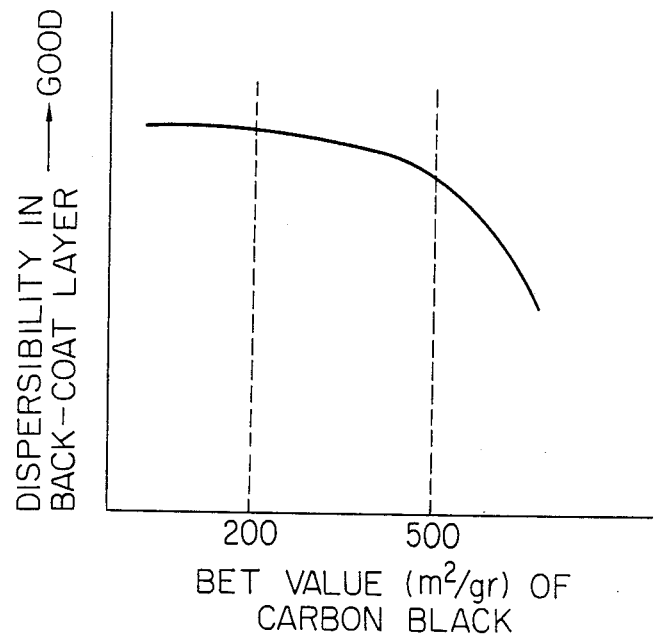
FIG. 3 is a graph showing a characteristic curve representing the relation between the BET value of carbon black and the dispersibility of the carbon black in the backcoat layer.
Figure 4:
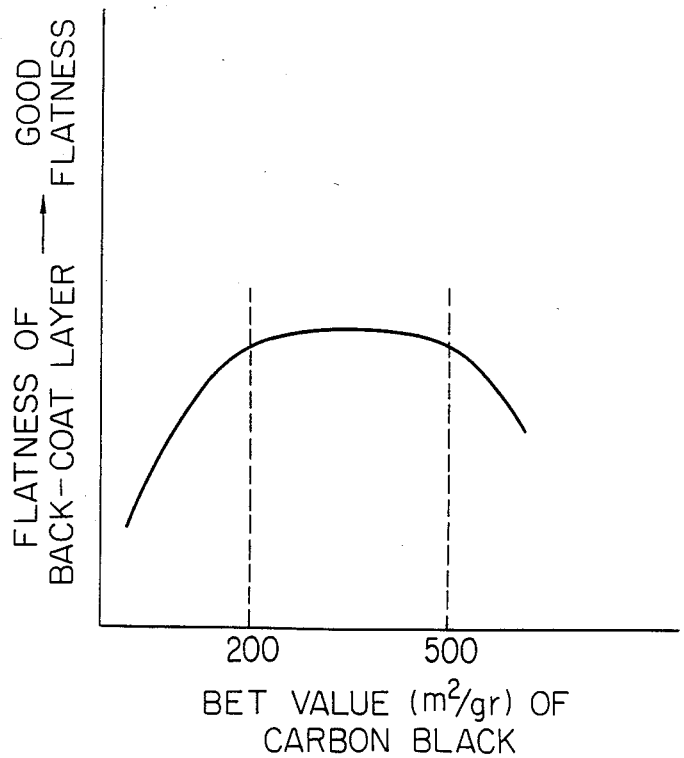
FIG. 4 is a graph showing a characteristic curve representing the relation between the BET value of the carbon black and the flatness of the backcoat layer.

In the present invention, in order to lower the surface resistivity of the magnetic layer and the like, the foregoing BET value-having carbon black is used, and as the carbon black, one whose particles are linked like bunches of grapes is suitable, and which is porous, having a large specific surface; i.e., having a high structure level, is desirable. Product examples of such the carbon black includes, e.g., "Conductex 975"(specific surface 270 m$^2$/g, particle size 46 m$\mu$) and "Conductex 950"(specific surface 245 m$^2$/g, particle size 45 m$\mu$), produced by Columbia Carbon, and "Cabot Vulcan XC-72"(specific surface 257 m$^2$/g, particle size 18 m$\mu$) by Cabot, and the like can be used. If the specific surface of the carbon black is larger than 500 m$^2$/g, exceeding the range, although the conductivity and light-shieldability are satisfactory when the carbon black is completely dispersed, the dispersion of the carbon black, as previously mentioned, is still not completed even at the time of completion of the dispersion of the magnetic powdery material, thus causing the layer surface to become coarse and to produce pinholes thereon. If the specific surface is less than 200 m$^2$/g, no effect of the addition of the carbon black can be expected. The above relations are as shown in FIGS. 3 and 4.

As the usable other nonmagnetic powdery material there may be used one of or two or more in combination of silicon oxide, titanium oxide, aluminum oxide, chromium oxide, calcium carbonate, zinc oxide, $\alpha Fe_2O_3$, talc, kaolin, silicon carbide, calcium sulfate, silicon nitride, zinc fluoride, molybdenum disulfide, and the like.

The backcoat layer of the magnetic recording medium of the present invention is formed by coating and drying a backcoat layer coating liquid on the reverse side of a support to the magnetic layer formed thereon, the backcoat layer coating liquid being obtained by preparing in the manner that at least the foregoing BET value-having carbon black and silicon-modified polyurethane together are kneaded to be dispersed into a solvent.

The magnetic layer is formed by coating and drying on a support a magnetic layer coating liquid obtained by preparing in the manner that a magnetic powdery material and binder together are kneaded to be dispersed into a solvent.

In the magnetic material coating liquid there may, if necessary, be incorporated such additives as dispersing agent, lubricant, abrasive, antistatic agent, and the like.

Methods for the preparation of the magnetic layer coating liquid are described in detail in Japanese Patent Examined Publication Nos. 15/1960, 26794/1964, 186/1968, 28043/1972, 28045/1972, 28046/1972, 28048/1972, 31445/1972, 11162/1973, 21331/1973 and 33683/1973, and West German OLS Pat. No. 2,060,655, and the like.

Those magnetic powdery materials usable in the magnetic layer of the magnetic recording medium of the present invention include such oxide-type magnetic powdery materials as E-Fe$_2$O$_3$, Fe$_3$O$_4$, Co-containing E-Fe$_2$O$_3$, Co-containing Fe$_3$O$_4$, CrO$_2$, etc.; such metallic magnetic powdery materials as Fe-Al alloy, Fe-Al-P alloy, Fe-Ni-Co alloy, Fe-Mn-Zn alloy, Fe-Ni-Zn alloy, Fe-Co-Ni-Cr alloy, Fe-Co-Ni-P alloy, Co-Ni alloy, Co-P alloy, etc.; and the like.

Those binder materials usable in the magnetic layer of the magnetic recording medium of the present invention include thermoplastic resins, thermosetting resins, reactive-type resins, electron beam-setting resins and mixtures of these resins.

As the thermoplastic resin there may be used those whose softening point is less than 150° C., average molecular weight is from 10,000 to 200,000, and polymerization degree is from about 200 to about 2,000, and which include, e.g., vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, methacrylate-vinylidene chloride copolymers, methacrylate-ethylene copolymers, urethane elastomers, polyvinyl fluoride, vinylidene chloride-acrylonitrile copolymers, acrylonitrile-butadiene copolymers, polyamide resins, polyvinylbutyrals, cellulose derivatives (such as cellulose acetate-butyrate, cellulose diacetate, cellulose triacetate, cellulose propionate, nitrocellulose, etc.), styrene-butadiene copolymers, polyester resins, chlorovinylether-acrylate copolymers, amino resins, various synthetic rubber-type thermoplastic resins, and mixtures of these resins These resins are described in Japanese Patent Examined Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973; and U.S. Pat. Nos. 3,144,352, 3,419,420, 3,499,789 and 3,713,887.

As the thermosetting or reactive-type resin there may be used those whose molecular weight in the state of a coating liquid is from 10,000 to 200,000 and becomes infinite due to the condensation reaction or addition reaction after their coating and drying.

Among these resins, preferred are those which are not softened nor fused during the period until they are thermally decomposed, and which include, for example, phenol resins, epoxy resins, polyurethane-setting resins, urea resins, melamine resins, alkyd resins, silicone resins, acryl-type reactive resins, high-molecular-weight polyester resin/isocyanate prepolymer mixtures, methacrylate copolymer/diisocyanate prepolymer mixtures, polyester polyol/polyisocyanate mixtures, urea-formaldehyde resin low-molecular glycol/high-molecular-weight diol/triphenylmethane triisocyanate mixtures, polyamine resins, and mixtures of these resins.

These resins are described in Japanese Patent Examined Publication Nos. 8103/1964, 9779/1965, 7192/1966, 8106/1966, 14275/1966, 18179/1967, 12081/1968, 28023/1969, 14501/1970, 24902/1970, 13103/1971, 22067/1972, 22072/1972, 22073/1972, 28045/1972, 28048/1972 and 28922/1972; and U.S. Pat. Nos. 3,144,353, 3,320,090, 3,437,510, 3,597,273, 3,781,210 and 3,781,211.

Those usable electron beam-setting resins include such unsaturated prepolymers as, e.g., maleic anhydride-type, urethaneacryl-type, epoxyacryl-type, polyesteracryl-type, polyetheracryl-type, polyurethaneacryl-type, polyamidoacryl-type resins, and as multifunctional monomers, etheracryl-type, urethaneacryl-type, epoxyacryl-type, phosphate-acryl-type, aryl-type, hydrocarbon-type resins, and also include those silicon-modified polyurethanes used for the backcoat layer. These binders enumerated above may be used alone or in combination, and may, if necessary, be used together with other additives.

The mixing proportion of the binder to the magnetic powdery material is: 5-100 parts by weight, preferably 10-50 parts by weight of the binder to 100 parts by weight of the magnetic powdery material. If the mixing quantity of the binder exceeds the range, the recording density of the resulting recording medium is deteriorated, and if the quantity is too small, the strength of the magnetic layer is reduced, deteriorating the durability and causing an undesirable exfoliation trouble.

Further, any of various hardening agents may be incorporated in the magnetic layer for the purpose of improving the durability of the magnetic recording medium. For example, isocyanates may be incorporated.

Those usable aromatic isocyanates include, e.g., tolylenediisocyanate (hereinafter called "TDI"), 4,4'-diphenylmethanediisocyanate (hereinafter called "MDI"), xylenediisocyanate (hereinafter called "XDI"), metaxylilenediisocyanate (hereinafter called "MXDI"), and addition products of these isocyanates and active hydrogen compounds, and the preferred are those whose average molecular weight is in the range of from 100 to 3,000. Product examples of these include "Sumidur -T80," "Sumidur -44S," "Sumidur -PF," "Sumidur -L," "Desmodur -T65," "Desmodur -15," "Desmodur -R," "Desmodur -RF," "Desmodur -IL," and "Desmodur -SL," manufactured by Sumitomo-Bayer Urethane Co., Ltd.; "Takenate 300S" and "Takenate 500," by Takeda Chemical Industries Co., Ltd.; "NDI" and "TODI," by Mitsui-Nisso Urethane Co., Ltd.; "Desmodur T/Co," "Millionate MR," "Millionate MT" and "Colonate L," by Nippon Urethane Co., Ltd.; "PAPI-135," "TDI-165," "TDI-80," "TDI-100," "Isonate 125M" and "Isonate 1431," by Kasei-Upjohn Co., Ltd.; and the like.

On the other hand, those usable aliphatic isocyanates include hexamethylenediisocyanate (hereinafter called "HMDI"), lysineisocyanate, trimethylhexamethylenediisocyanate (hereinafter called "THDI") and addition products of these isocyanates and active hydrogen compounds. Among these aliphatic isocyanates and addition products of these isocyanates and active hydrogen compounds the preferred are thos whose molecular weight is in the range of from 100 to 3,000. The particularly preferred among these aliphatic isocyanates are nonalicyclic isocyanates and addition products of these compounds and active hydrogen compounds.

Product examples of such compounds include, for example, "Sumidur N" and "Desmodur Z4273," manufactured by Sumitomo-Bayer Urethane Co., Ltd.; "Duranate 50M," "Duranate 24A-100" and "Duranate 24A-90CX," by Asahi Chemical Industry Co., Ltd.; "Colonate HL," by Nippon Polyurethane Co., Ltd.; and "TMDI", by Chemische Werke Huls AG. The nonalicyclic isocyanates among aliphatic isocyanates include, e.g., methylcyclohexane-2,4-diisocyanates, 4,4'-methylene-bis(cyclohexylisocyanate), isophoronediisocyanate, and addition products of these compounds with active hydrogen compounds. As examples of such compounds there are products under the trade names "IPDI", "PDI-T1890," "H2921" and "B1065," and the like, manufactured by Chemische Werke Huls AG.

Those usable polyisocyanates include addition products of diisocyanates and trihydric polyols, pentamers of diisocyanates, and decarbon compounds obtained from 3 moles of diisocyanates and water. Examples of these compounds include the addition product of 3 moles of tolylenediisocyanate and 1 mole of trimethylolpropane, the addition product of 3 moles of metaxylilenediisocyanate and 1 mole of trimethylolpropane, and pentamer comprised of 2 moles of tolylenediisocyanate. These can be industrially produced.

In the magnetic layer, in addition to the foregoing magnetic powdery materials, binders and hardening agents there may be incorporated such additives as dispersing agents, abrasives, antistatic agents, and the like.

Those usable dispersing agents include lecithin, phosphates, amine compounds, alkyl sulfates, fatty acid amides, higher alcohols, polyethyleneoxides, sulfosuccinic acid, sulfosuccinates, prior-art surface active agents, and salts of these compounds, and also include salts of negative organic group (e.g., —COOH, —PO$_3$H) polymer dispersing agents. These dispersing agents may be used alone or in combination of two or more of them. These dispersing agents may be added in a quantity of 1-20 parts by weight to 100 parts by weight of the magnetic powdery material.

These dispersing agents are described in Japanese Patent Examined Publication Nos. 18064/1966, 84405/1974, 70811/1977 and 1048/1982; Japanese Patent O.P.I. Publication No. 33430/1982; and U.S. Pat. Nos. 3,587,993 and 3,470,021.

Those lubricants usable include silicone oil, carbon black, graphite, molybdenum disulfide, tungsten disulfide, and a fatty acid ester comprised of a monobasic fatty acid having from 12 to 16 carbon atoms and a monohydric alcohol having such number of carbon atoms that the total number of the carbon atoms of the ester is from 21 to 23 (the so-called wax). These are described in Japanese Patent Examined Publication Nos. 23889/1968 and 81543/1968; U.S. Pat. Nos. 3,470,021, 3,492,235, 3,497,411, 3,523,068, 3,625,720, 3,630,772, 3,634,253, 3,630,772, 3,634,253, 3,642,539 and 3,687,725; IBM Technical Disclosure Belletin Vol. 9, No. 9, Page 779 (December 1966); and ELEKTRONIK, No. 12, Page 380, 1961; and the like.

As the abrasive there may be used those generally used materials including fused alumina, silicon carbide, chromium oxide, corundum; artificial corundum, artificial diamond, garnet, emery (principal components: corundum and magnetite), and the like. These abrasives are used in the average particle size range of from 0.05 to $5\mu$, and preferably from 0.1 to $2\mu$. These abrasives may be used in the adding quantity range of from 0.5 to 20 parts by weight to 100 parts by weight of the magnetic powdery material. These abrasives are described in Japanese Patent O.P.I. Publication No. 115510/1974; U.S. Pat. Nos. 3,007,807, 3,041,196 and 3,687,725; British Pat. No. 1,145,349; and West German (DT-PS) Pat. No. 853,211.

An antistatic agent may be added if necessary. Those usable antistatic agents include such conductive powdery materials as graphite, carbon black, tin oxide-antimony oxide-type compounds, tin oxide-titanium oxide-antimony oxide-type compounds, carbon black-graft polymers, etc.; such natural surfactants as saponin; such nonionic surfactants as alkyleneoxide-type, glycerol-type, and glycidol-type compounds; such cationic surfactants as higher alkylamines, quaternary pyridines and other heterocyclic compounds, phosphoniums, sulfoniums, etc.; such anionic surfactants as carboxilic acids, sulfonic acids, phosphoric acids, those surfactants containing such acid radicals as sulfuric acid ester radicals, phosphoric acid ester radicals, etc.; such amphoteric surfactants as amino acids, aminosulfonic acids, sulfuric or phosphoric acid esters of alcohols, etc.; and the like.

These surfactants usable as the antistatic agent are described in U.S. Pat. Nos. 2,271,623, 2,240,472, 2,288,226, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974; West German (OLS) Pat. No. 1,942,655; British Pat. Nos. 1,077,317 and 1,198,450; the "Kaimen-Kasseizai no Gosei to Sono Oyo (Syntheses and Applications of Surface Active Agents)" by Ryohei Oda (Maki Shoten, 1964); the "Surface Active Agents" by J. W. PERRY (Interscience Publication, Inc., 1949); the "Encyclopedia of Surface Active Agents, Vol. 2" by T. P. Sisley (Chemical Publish Company, 1964); the "Kaimen-Kasseizai Binran (Handbook of Surface Active Agents)" 6th ed. (Sangyo Tosho, K. K., Dec. 20, 1966); and the like. These surface active agents may be added alone or in a mixture. These are used as the antistatic agent, but can also be used for other purposes: for dispersion, for improvement on magnetic characteristics, for improvement on lubricity, and as a coating aid.

The use of the silicon-modified polyurethane in the backcoat layer or in the magnetic layer allows the reduction of the using quantities of these lubricants or antistatic agents, leading to improvement of the magnetic layer's characteristics.

The magnetic recording medium of the present invention is produced by coating and drying on a support a magnetic coating liquid prepared by kneading and dispersing such components as the foregoing magnetic powdery material, binder, etc., into a solvent.

The magnetic layer coating liquid may contain, in addition to the foregoing magnetic layer components, if necessary, such additives as dispersing agents, lubricants, abrasives, antistatic agents, and the like.

As the solvent for use in preparing or in coating the magnetic layer coating liquid there may be used any of those solvents including such ketone-type solvents as acetone, methylethyl ketone (MEK), methyl-isobutyl ketone (MIBK), cyclohexane, etc.; such alcohol-type solvents as methanol, ethanol, propanol, butanol, etc.; such ester-type solvents as methyl acetate, ethyl acetate, butyl acetate, ethyl lactate, propyl acetate, ethylene glycol monoacetate, etc.; such ether-type solvents as diethylene glycol dimethylether, 2-ethoxyethanol, tetrahydrofuran, dioxane, etc.; such aromatic hydrocarbons as benzene, toluene, xylene, etc.; such halogenated hydrocarbons as methylenechloride, ethylenechloride, carbon tetrachloride, chloroform, dichlorobenzene, etc.; and the like.

In kneading the magnetic layer coating components, the foregoing magnetic powdery material and other components are all simultaneously or sequentially put in a kneader. For example, the foregoing magnetic powdery material is first added to a dispersing agent-containing solution to be kneaded for a given period of time therein, and then other various components are added to continue the kneading to thereby prepare a magnetic layer coating liquid.

For kneading and dispersing the components there can be used various kneaders such as, e.g., two-roll mill, three-roll mill, ball mill, pebble mill, sand grinder, Sjegvari attriter, high-speed impeller disperser, high-speed stone mill, high-speed impact mill, disperkneader, high-speed mixer, homogenizer, ultrasonic disperser, or the like.

Kneading and dispersing techniques are described in the "Paint Flow and Pigment Dispersion" by T. O. Patton (John Willey and Son, 1964), and also in U.S. Pat. Nos. 2,581,414 and 2,855,156.

Those materials usable as the support include such polyesters as polyethylene terephthalate, polyethylene-2,6-naphthalene, etc.; polyolefins such as polypropylene; such cellulose derivatives as cellulose triacetate, cellulose diacetate, etc.; such plastics as polycarbonate; such metals as Cu, Al, Zn, etc.; glass plates; such ceramics as the so-called new ceramics (e.g., boron nitride, silicon carbide), etc.; and the like.

The support may be used in any of the tape, sheet, card, disk or drum form. These materials may be selected according to a necessary form to be used as the support. The thickness of these support materials should be from about $3\mu$ to about $100\mu$, and preferably from $5\mu$ to $50\mu$ for the tape or sheet form; from $30\mu$ to 10 mm for the disk or card form; and should be in a cylindrical form for the drum-type support; and each individual form is to be determined according to the recorder used.

Those methods usable for coating the foregoing magnetic layer coating liquid on the support to form a magnetic layer thereon include gravure-roll coating, wire-bar coating, doctor-blade coating, reverse-roll coating, dip coating, air-knife coating, calender coating, squeeze coating, kiss coating, fountain coating, and equivalent others. These coating methods are described in detail in the "Kōtingu Kōgaku (Coating Engineering)" (page 258, published by Asakura Shoten, March 1971); and the "Plastic Film -Kakō To Sono Ōyō-(Processing and Applications of Plastic films)"(published by Gihōdō, 1971).

The magnetic layer coated on a support by one of such methods, after the magnetic powdery material of the present invention contained in the magnetic layer, if necessary, is subjected to an orientation treatment, is dried and, if necessary, subjected to a surface smoothing treatment, and then cut into pieces in a desired form, thus producing magnetic recording mediums.

The orientation direction of the magnetic powdery material used in the magnetic recording medium of the present invention is determined according to its use.

In addition, examples of the synthesis of the silicon-modified polyurethane to be used in the backcoat layer of the magnetic recording medium of the present invention are as follows:

SYNTHESIS EXAMPLE 1

In a reactor equipped with a stirrer and a reflux condenser, after the inside air is replaced by a nitrogen gas, are placed 60 parts of methyl-ethyl ketone (MEK), and to this are added 81 parts of polycarbonate diol (molecular weight: 2,000) produced from 1,6-hexane-diol, 54 parts of polydimethylsiloxanedicarbinol (molecular weight: 5500), 117 parts of isophoronediisocyanate (IPDI), and 0.03 part of dibutyl tin dilaurate (DBTDL), and a reaction of them takes place at 80° C. for two hours. To this solution are added 41 parts of 1,4-butane-diol and 30 parts of MEK to hold a reaction therewith at 80° C. for an hour, and then to this reaction liquid are further added 7 parts of triethanolamine and 610 parts of MEK to hold a reaction therewith at 80° C. for another hour. The thus obtained silicon-modified polyurethane solution contains 33% by weight of solid matter and has a viscosity of 650 cps (at 25° C.), and the resin resulting from the solution has a stress (M100) at the time of 100% elongation of 96 kg/cm$^2$, a tensile strength (T) of 490 kg/cm$^2$, and an elongation (E) of 330%.

SYNTHESIS EXAMPLE 2

In a nitrogen gas-replaced reactor equipped with a stirrer and a reflux condenser are put 300 parts of MEK, and to this are added 60 parts of polydimethylsiloxanedicarbinol (average molecular weight: 1,000), 175.5 parts of diphenylmethanediisocyanate (MDI), and 0.03 part of DBTDL to hold a reaction therewith at 80° C. for two hours. To this solution are further added 64.5 parts of neopentyl glycol (NPG), and 100 parts of MEK to hold another reaction therewith at 80° C. for two hours, and then to the reaction liquid are further added 5 parts of isopropanol and 300 parts of MEK to hold a further reaction therewith at 70° C. for 30 minutes. The thus obtained silicon-modified polyurethane solution contains 35% by weight of solid matter and has a viscosity of 5900 cps (at 25° C.). The resin obtained from this solution has an yield-point stress (Ys) of 450 kg/cm$^2$, an yield-point elongation of 5%, and a Young's modulus of 14,000 kg/cm$^2$. The Ys, yield-point elongation and Young's modulus were determined using a 5 mm-wide strip sample set at a gauge length of 50 mm with an extension rate of 5 mm/min.

SYNTHESIS EXAMPLE 3

In a nitrogen gas-replaced reactor equipped with a stirrer and a reflux condenser are put 300 parts of MEK, and to this are added 60 parts of polydimethylsiloxanedicarbinol (average molecular weight: 5,500), 166.5 parts of MDI, and 0.03 part of DBTDL to hold a reaction therewith at 80° C. for two hours. To this solution are further added 65 parts of NPG and 100 parts of MEK to hold another reaction therewith at 80° C. for two hours, and then to the liquid are further added 9 parts of triethanolamine and 300 parts of MEK to hold a further reaction therewith at 80° C. for an hour. The thus obtained TPU solution contains 31% by weight of solid matter and has a viscosity of 1,000 cps (at 25° C.). The resin obtained from the solution has an yield-point stress of 280 kg/cm$^2$, an yield-point elongation of 4% and a Young's modulus of 11,500 kg/cm$^2$.

SYNTHESIS EXAMPLE 4

Using methyl-isobutyl ketone as a solvent, 60 parts of a polyester diol (average molecular weight: 2,000) obtained by the condensation reaction of 1,4-butane-diol with adipic acid, 162.5 parts of MDI and 64 parts of NPG are reacted to thereby produce a Polyurethane Solution A (containing 30% by weight of solid matter).

100 parts of the thus obtained Solution A are mixed with 100 parts of the thermoplastic resin solution obtained in Example 2. The resin obtained from the mixture has, as the mechanical strength thereof, an yield-point of 500 kg/cm$^2$, an yield-point elongation of 5%, and a Young modulus of 20,000 kg/cm$^2$. The resin, therefore, is excellent in the water repellence, lubricity and specular gloss finishability as compared to the resin obtained from Solution A.

SYNTHESIS EXAMPLE 5

In a nitrogen-replaced reactor equipped with a stirrer and a reflux condenser are put 80 parts of MEK, and to this are added 252 parts of polytetramethylene-ether glycol (molecular weight: 2,000), 28 parts of polydimethylsiloxanedicarbinol (molecular weight: 1,800), 83 parts of IPDI and 0.04 parts of DBTDL to hold a reaction thereof at 80° C. for two hours. To the solution are further added 220 parts of MEK, 37 parts of isophoronediamine and 300 parts of isopropanol to hold another reaction thereof at 30° C. for an hour, and then to continue the reaction at 50° C. for two hours. The thus obtained TPU solution contains 42% by weight of solid matter and has a viscosity of 6,000 cps (at 25° C.). The silicon-modified polyurethane obtained from the solution has a M100 of 30 kg/cm$^2$, a T of 430 kg/cm$^2$, and an E of 780%. The M100, T and E are determined in accordance with JIS K-6301 (Dumbbell form No. 5) except that a 100$\mu$-thick film is used and tested at an extension rate of 300 mm/min.

Effects of the Invention

The effects of the magnetic recording medium of the present invention are as follows:

(1) Since the silicon-modified polyurethane and the foregoing BET value-having carbon black are incorporated in the backcoat layer, the magnetic recording medium is not only improved in the lubricity without using any special lubricant but free from bleed-out, deposition and backcoat layer-magnetic layer sticking troubles.

(2) In the method for roughening the surface of the backcoat layer by the incorporation of a nonmagnetic powdery material therein, the method will not display its effect unless the surface is considerably coarsely roughened. And if roughened excessively, the coarse pattern would be transferred onto the magnetic layer to thereby deteriorate the characteristics of the recording medium.

On the other hand, in the present invention, because the silicon-modified polyurethane is used in combination with at least the foregoing BET value-having carbon black, the surface of the backcoat layer is maintained relatively smooth by the combined effect of the silicon-modified polyurethane's own lubricity with the appropriate roughness due to the foregoing carbon black, so that the smoothness of the magnetic layer will not be impaired.

(3) The combined use of the carbon black enables to remove various disadvantages due to the charge of static electricity.

(4) The combined use of other nonmagnetic powdery materials largely improves the prevention of possible backcoat layer-magnetic layer sticking trouble.

EXAMPLES

The present invention will be illustrated in detail by the following examples and comparative examples.

The components, proportions, procedures, etc., which will be described hereinafter are allowed to be altered as long as they do not deviate from the spirit of the present invention.

The term "part(s)" used hereinafter in the following examples and comparative examples all represents part(s) by weight.

EXAMPLES 1-8

The composition components given in the first column of the following Table 3, taken in the proportions shown in the second, fifth, seventh, tenth, thirteenth, fourteenth, fifteenth and seventeenth columns of the same table, were stirred to be mixed in a ball mill over a period of 30 hours, and then each of the resulting compositions was filtrated through a filter having average hole size of $1\mu$, and to the filtrate were added 5 parts of a multifunctional isocyanate (hardening agent) and uniformly mixed, thereby preparing eight different backcoat layer coating liquids.

Each of the resulting backcoat layer coating liquids was coated by a reverse-roll coater and dried on a $14\mu$-thick polyester film support to thereby form a backcoat layer, whereby eight backcoat layer-coated samples were prepared.

TABLE 3

| Composition | Example 1 | Control example 1 | Control example 2 | Example 2 | Control example 3 | Example 3 | Control example 4 | Control example 5 |
|---|---|---|---|---|---|---|---|---|
| Silicon-modified polyurethane | 45 parts | 45 parts | 45 parts | 70 parts | 70 parts | 65 parts | 65 parts | 65 parts |
| N—2304 | — | — | — | — | — | — | — | — |
| Vinyl chloride-vinyl acetae copolymer | 25 | 25 | 25 | 15 | 15 | 20 | 20 | 20 |
| Nitrocellulose | 30 | 30 | 30 | 15 | 15 | 15 | 15 | 15 |
| Carbon black (1) (BET value = $150 m^2/g$ | — | — | — | — | — | — | 15 | — |
| Carbon black (2) (BET value = $270 m^2/g$ | 15 | — | — | 25 | — | 15 | — | — |
| Carbon black (3) (BET value = $900 m^2/g$ | — | — | — | — | — | — | — | 15 |
| KF-96 (trade name) (silicone oil produced by Shinetsa Silicon Co.) | — | — | — | — | — | — | — | — |
| Titanium white | — | — | 50 | 10 | — | — | — | — |
| Lecithin | 2 | — | 5 | 5 | — | 2 | 2 | 2 |
| Cyclohexanone | 150 | 150 | 150 | 150 | 150 | 150 | 150 | 150 |
| MEK | 150 | 150 | 150 | 150 | 150 | 150 | 150 | 150 |

| Composition | Example 4 | Control example 6 | Control example 7 | Example 5 | Example 6 | Example 7 | Control example 8 | Example 8 |
|---|---|---|---|---|---|---|---|---|
| Silicon-modified polyurethane | 65 parts | — | — | 50 parts | 50 parts | 20 parts | — | 60 parts |
| N—2304 | — | 60 parts | 60 parts | — | — | — | 20 parts | — |
| Vinyl chloride-vinyl acetae copolymer | 20 | 20 | 20 | 25 | 10 | 40 | 40 | 40 |
| Nitrocellulose | 20 | 20 | 20 | 25 | 10 | 40 | 40 | — |
| Carbon black (1) (BET value = $150 m^2/g$ | — | — | — | — | — | — | — | — |
| Carbon black (2) (BET value = $270 m^2/g$ | 15 | 15 | 15 | 20 | 30 | 20 | 20 | 15 |
| Carbon black (3) (BET value = $900 m^2/g$ | — | — | — | — | — | — | — | — |
| KF-96 (trade name) (silicone oil produced by Shinetsa Silicon Co.) | — | — | 5 | — | — | — | — | — |
| Titanium white | — | — | — | — | — | — | — | — |

TABLE 3-continued

| | | | | | | | | |
|---|---|---|---|---|---|---|---|---|
| Lecithin | 2 | 2 | 2 | 2 | 2 | 2 | 2 | 2 |
| Cyclohexanone | 150 | 150 | 150 | 150 | 150 | 150 | 150 | 150 |
| MEK | 150 | 150 | 150 | 150 | 150 | 150 | 150 | 150 |

Subsequently, the magnetic powdery material-containing compositions obtained by mixing the components given in the first column of Table 4 in the proportions shown in the second, fifth, seventh, tenth, thirteenth, fourteenth, fifteenth and seventeenth columns of the same table were kneaded and dispersed in a ball mill over a period of 72 hours, and then each of the resulting compositions was filtrated through a filter having average hole size of $1\mu$, and to the filtrate were added a multifunctional isocyanate, and then coated so as to be $5\mu$-thick by a reverse-roll coater and then dried on the reverse side of the foregoing polyester film support to the backcoat layer-formed side thereof to thereby form a magnetic layer, whereby eight magnetic and backcoat layers-formed samples were produced.

the methods of Synthesis Examples-1 to -5, and their corresponding relations are as follows:
  Examples-1 and -8: Synthesis Example-4
  Example-2: Synthesis Example-2
  Example-3: Synthesis Example-3
  Example-4: Synthesis Example-5
  Examples-5, -6 and -7: Synthesis Example-1

COMPARATIVE EXAMPLES 1–8

The coating liquid compositions as given in the first column of Table 3 were taken in the proportions as shown in the third, fourth, sixth, eighth, ninth, eleventh, twelfth and sixteenth columns of the same table and stirred to be mixed in a ball mill over a period of 30 hours, and then each of the resulting compositions was

TABLE 4

| | Example No. | | | | | | | |
|---|---|---|---|---|---|---|---|---|
| Composition | Example 1 | Control example 1 | Control example 2 | Example 2 | Control example 3 | Example 3 | Control example 4 | Control example 5 |
| Co-containing $1\text{-}Fe_2O_3$ | 100 parts | 100 parts | 100 parts | 100 parts | 100 parts | — | — | — |
| Fe-type metallic magnetic powdery material | — | — | — | — | — | 100 parts | 100 parts | 100 parts |
| Pandex T-5205 | 8 | 8 | 8 | 8 | 8 | 8 | 8 | 8 |
| Vinyl chloride-vinyl acetate copolymer | 6 | 6 | 6 | 6 | 6 | 4 | 4 | 4 |
| Nitrocellulose | 6 | 6 | 6 | 6 | 6 | 8 | 8 | 8 |
| Lecithin | 3 | 3 | 3 | 3 | 3 | 3 | 3 | 3 |
| Alumina | 5 | 5 | 5 | 5 | 5 | 5 | 5 | 5 |
| Carbon black | 5 | 5 | 5 | 5 | 5 | 5 | 5 | 5 |
| Cyclohexanone | 100 | 100 | 100 | 100 | 100 | 100 | 100 | 100 |
| MEK | 80 | 80 | 80 | 80 | 80 | 80 | 80 | 80 |
| Toluene | 50 | 50 | 50 | 50 | 50 | 50 | 50 | 50 |

| | Example No. | | | | | | | |
|---|---|---|---|---|---|---|---|---|
| Composition | Example 4 | Control example 6 | Control example 7 | Example 5 | Example 6 | Example 7 | Control example 8 | Example 8 |
| Co-containing $1\text{-}Fe_2O_3$ | 100 parts | 100 parts | 100 parts | 100 parts | 100 parts | 100 parts | 100 parts | 100 parts |
| Fe-type metallic magnetic powdery material | — | — | — | — | — | — | — | — |
| Pandex T-5205 | 8 | 8 | 8 | 8 | 8 | 8 | 8 | 8 |
| Vinyl chloride-vinyl acetate copolymer | 6 | 6 | 6 | 6 | 6 | 6 | 6 | 6 |
| Nitrocellulose | 6 | 6 | 6 | 6 | 6 | 6 | 6 | 6 |
| Lecithin | 3 | 3 | 3 | 3 | 3 | 3 | 3 | 3 |
| Alumina | 5 | 5 | 5 | 5 | 5 | 5 | 5 | 5 |
| Carbon black | 5 | 5 | 5 | 5 | 5 | 5 | 5 | 5 |
| Cyclohexanone | 100 | 100 | 100 | 100 | 100 | 100 | 100 | 100 |
| MEK | 80 | 80 | 80 | 80 | 80 | 80 | 80 | 80 |
| Toluene | 50 | 50 | 50 | 50 | 50 | 50 | 50 | 50 |

A supercalender treatment was made on the magnetic layer surface of each of the thus obtained eight web samples, and then the webs each was slit into 12.65 mm-wide video tape samples. The thus produced eight video tapes were regarded as Tape Examples-1, -2, -3, -4, -5, -6, -7 and -8 according to the difference in the mixing proportion between the compositions given in the second, fifth, seventh, tenth, thirteenth, fourteenth, fifteenth and seventeenth colums, respectively, of Tables-3 and -4.

In addition, these silicon-modified polyurethanes that were used in Examples-1 to -8 are the ones obtained by filtrated through a filter having average hole size of $1\mu$, and to the filtrate were added 5 parts of a multifunctional isocyanate (hardening agent) and uniformly mixed to thereby produce eight backcoat layer coating liquids.

Each of the thus prepared backcoat layer coating liquids was coated by a reverse-roll coater and then dried on a $14\mu$-thick polyester film support to form a backcoat layer thereon, whereby eight backcoat layer-formed samples were prepared.

Subsequently, the magnetic powdery material-containing compositions obtained by mixing the composition components as given in the first column of Table 4 in the proportions as shown in the third, fourth, sixth, eighth, ninth, eleventh, twelfth and sixteenth columns of the same table were kneaded and dispersed in a ball mill over a period of 72 hours, and then filtrated through a 1μ average hole-having filter, and to the filtrate were added 5 parts of a multifunctional isocyanate, and then the resulting coating liquid was coated so as to be 5μ-thick by a reverse-roll coater and then dried on the reverse side of the foregoing polyester support to the backcoat layer formed thereon, whereby eight magnetic and backcoat layers-formed samples were prepared.

A supercalender treatment was made on the surface of each of the thus obtained web samples, and then the webs each was slit into 12.65 mm-wide video tapes.

The thus prepared eight video tapes were regarded as Comparative Tape Examples-1, -2, -3, -4, -5, -6, -7 and -8 accordting to the difference in the mixing proportion between the compositions given in the third, fourth, sixth, eighth, ninth, eleventh, twelfth and sixteenth columns, respectively, of Table-3 and -4.

In addition, these silicon-modified polyurethanes that were used in Comparative Examples-1 to -8 are the ones obtained by the methods of Synthesis Examples-1 to -5, and their corresponding relations are as follows:

Comparative Examples-1 and -2: Synthesis Example-4

Comparative Example-3: Synthesis Example-2

Comparative Examples-4 and -5: Synthesis Example-3

Comparative Examples-6 and -7: Synthesis Example-5

Comparative Example-8: Synthesis Example-1

In Table 3, the "N-2304" is the trade name of the polyurethane produced by Nippon Polyurethane Co., Ltd.; the "vinyl chloride-vinyl acetate copolymer" represents a partially-hydrolyzed vinyl chloride-vinyl acetate copolymer; and as the "nitrocellulose," a nitrocellulose having a viscosity of ½ second, determined in accordance with JIS (Industrial Standards) K-6703 (1975) was used.

In Table 4, the "Pandex T-5205" is the trade name of the polyurethane manufactured by Dai Nippon Ink, Inc.; the "vinyl chloride-vinyl acetate copolymer" represents a partially-hydrolyzed copolymer as in Table 3; the "nitrocellulose" is also the same one as in Table 3; and the "Fe-type metallic magnetic powdery material" is one containing not less than 60% by weight of Fe.

The characteristics of Tape Samples-1 to -8 of Examples-1 to -8 and Control Tape Samples-1 to -8 of Comparative Examples-1 to -8 were tested with respect to the tape running stability, coefficient of friction, surface resistivity, wound appearance, surface roughness, bleed-out and chroma S/N, and the obtained test results are as given in Table 5.

In Table 5,
(1) Tape running stability: Using a Victor HR-3300 deck, the tension of each sample at the outlet of the head drum, where the tape tension is to become highest, was measured by a Tape Tension Meter manufactured by Tentel, and the results obtained by the test were classified and indicated in Table 5 as follows:
50 to 70 g: Excellent (Ex)
71 to 100 g: slightly insufficient but acceptable (Ac)
More than 100 g: Unacceptable (Un)

(2) Coefficient of friction: The magnetic layer side of each sample was contacted with and wound 180° around a 4 mm-diameter stainless-steel-made fixed pin; the tensile force on the inlet side is maintained to be 50 g with respect to the fixed pin; the tensile force on the outlet side at a tape running rate of 3.3 cm/second was measured; and then a coefficient of friction was found from the following formula:

$$\mu = \frac{1}{\pi} \ln \frac{\text{outlet-side tensile force}}{\text{inlet-side tensile force}}$$

(3) Surface resistivity (surface electric resistance): Each sample was placed with its magnetic layer side down on a parallel electrode with an inter-electrode length of 50 mm to find the resistance (Ω.cm) at an impressed voltage of 500 V.

(4) Wound appearance: When each sample tape was wound to make 200 winds around a reel, each wind condition of the tape was observed, and the results were classified and indicated in Table 5 as follows:
No disarray is found: Excellent (Ex)
Disarray is found at times but acceptable: Good (G)
Disarray is often found and possibly causes damage to tape edges: Hardly acceptable (Ha)
Disarray is conspicuous: Unacceptable (Un)

(5) Surface roughness: A surface roughness meter "Visolater" manufactured by Tokyo Seiki Co., Ltd. was used to measure the surface roughness of each sample (in μ). In the table, the "Ra" represents a center line average roughness and the "Rmax" represents the maximum roughness.

(6) Bleed-out: Each sample was allowed to stand for 24 hours under the conditions of 40° C. and 80% RH, and then the surface of the aged sample was observed through an optical microscope.

(7) Chroma S/N: The chroma S/N is expressed as the ratio of the effective value (S) of chroma signals taken out alone from a picture, when reproduced, that was recorded with a chroma signal (3.58 MHz) at 0.714 $V_{p-p}$ put on luminance signals to the noise level (N) obtained by excluding the chroma signal from the effective value. In Table 5, however, the results are shown as relative values to the value of Control Tape Example 2, which is regarded as 0 dB.

Also in Table 5, the "BC" stands for the backcoat.

TABLE 5

| Characteristics | Example 1 | Control example 1 | Control example 2 | Example 2 | Control example 3 | Example 3 | Control example 4 | Control example 5 |
|---|---|---|---|---|---|---|---|---|
| Running stability[1] | (Ex) | (Ac) | (Ex) | (Ex) | (Un) | (Ex) | (Ac) | (Ac) |
| Coefficient of friction of BC layer | 0.25 | 0.28 | 0.21 | 0.19 | 0.19 | 0.18 | 0.17 | 0.20 |
| Surface resistivity of BC layer | $4 \times 10^8$ | $5 \times 10^{11}$ | $3 \times 10^{12}$ | $3 \times 10^8$ | $4 \times 10^{12}$ | $6 \times 10^8$ | $4 \times 10^{10}$ | $6 \times 10^8$ |
| Wound appearance[2] | (Ex) | (Un) | (G) | (Ex) | (Un) | (Ec) | (G) | (Ha) |
| Surface roughness (Ra) of BC layer | 0.021 | 0.015 | 0.040 | 0.020 | 0.015 | 0.018 | 0.015 | 0.04 |

TABLE 5-continued

| Characteristics | | | | | | | | |
|---|---|---|---|---|---|---|---|---|
| Maximum surface roughness (Rmax) of BC layer | 0.35 | 0.30 | 0.40 | 0.40 | 0.35 | 0.30 | 0.30 | 0.30 |
| Sticking between magnetic & BC layers | none | slightly occurs | none | none | occurs | none | none | none |
| Bleed-out (BC layer) | none | none | none | none | none | none | none | none |
| Adherence between[3] BC layer & support | (Ex) | (Ex) | (Ex) | (Ex) | (Ex) | (Ex) | (Ex) | (Ex) |
| Chroma S/N[3] | +1.5 | +2.0 | 0 | +2.0 | Measurement impossible | +2.0 | +1.5 | +0.5 |

| | Tape No. | | | | | | | |
|---|---|---|---|---|---|---|---|---|
| Characteristics | Example 4 | Control example 6 | Control example 7 | Example 5 | Example 6 | Example 7 | Control example 8 | Example 8 |
| Running stability[1] | (Ex) | (Un) | (Un) | (Ex) | (Ac) | (Ac) | (Un) | (Ac) |
| Coefficient of friction of BC layer | 0.25 | 0.55 | 0.30 | 0.25 | 0.18 | 0.45 | 0.55 | 0.28 |
| Surface resistivity of BC layer | $3 \times 10^8$ | $2 \times 10^8$ | $4 \times 10^8$ | $3 \times 10^8$ | $8 \times 10^8$ | $8 \times 10^8$ | $1 \times 10^8$ | $6 \times 10^8$ |
| Wound appearance[2] | (Ex) | (Ha) | (Ha) | (Ex) | (G) | (G) | (Un) | (G) |
| Surface roughness (Ra) of BC layer | 0.02 | 0.02 | 0.02 | 0.015 | 0.018 | 0.020 | 0.021 | 0.026 |
| Maximum surface roughness (Rmax) of BC layer | 0.45 | 0.35 | 0.50 | 0.30 | 0.35 | 0.25 | 0.38 | 0.43 |
| Sticking between magnetic & Bc layers | none | none | occurs | none | none | none | none | none |
| Bleed-out (BC layer) | none | none | occurs | none | none | none | none | none |
| Adherence between[3] BC layer & support | (Ex) | (Ex) | (Ex) | (Ex) | (Ex) | (Ac) | (Un) | (Ex) |
| Chroma S/N[3] | +1.5 | +0.5 | Measurement impossible | +2.0 | +1.0 | +1.2 | (Ac) | +0.5 |

Note:
[1]Running stability:
(Ex) — Excellent
(Ac) — Slightly insufficient, but acceptable
(Un) — Unacceptable
Note:
[2]Wound appearance:
(Ex) — Excellent (No disarray is found)
(G) — Good (Disarray is found at times, but acceptable)
(Ha) — Hardly acceptable (Disarray is often found and possibly causes damage to tape edges)
(Un) — Unacceptable (Disarray is conspicuous)
Note:
[3]Adherence, Chroma S/N:
(Ex) — Excellent
(Ac) — Acceptable
(Un) — Unacceptable By comparison of the above Examples-1 and -2 with Comparative Examples-1, -2 and -3, it is understood that the recording medium having a backcoat layer containing the silicon-modified polyurethane and carbon black with a BET value of 200–500 m²/g is excellent in the tape running stability because the backcoat layer has a small coefficient of friction; has a sufficiently small surface resistivity on the backcoat layer; has a good appearance when wound in a reel form; is excellent in the flatness of the backcoat layer; and therefore has little transfer onto the magnetic layer. Consequently, the medium is excellent also in the chroma S/N. On the other hand, however, those containing titanium white are inappropriate due to their large surface resistivity, while those containing no nonmagnetic powdery material are recognized to not only have a large surface resistivity but cause a sticking trouble with the magnetic layer.

As apparent from the comparison of Example-3 with Comparative Examples-4 and -5, the surface resistivity of the backcoat layer differs according to the BET value of the layer, and, if the BET value of the carbon black exceeds 500 m²/g, the dispersibility of the carbon black is reduced to coarsely roughen the surface to tend to cause a pattern transfer onto the magnetic layer, thus leading to the deterioration of the chroma S/N.

The comparison between Example-4 and Comparative Examples-6 and -7 is the comparison between the effect of ordinary polyurethanes not modified by silicon and that of the silicon-modified polyurethane of the present invention (all these samples contain carbon black having a BET value of from 200 to 500 m²/g), and it is apparent that, in the samples having such the backcoat layer of the present invention, the tape run is much stable due to the small coefficient of friction of the backcoat layer. As seen from Comparative Example-7, the one containing silicone oil causes a bleed-out trouble, deteriorating the magnetic layer to such an extent as to make it impossible to measure the characteristics (particularly chroma S/N) thereof.

The comparison between Examples-5, -6 and -7 and Comparative Example-8 is the comparison between the silicon-modified polyurethane of the present invention and an ordinary polyurethane with respect to the ratio in combination with other binders, and it is understood that the use of the ordinary polyurethane is disadvantageous in respect that it makes the tape run unstable and the chroma S/N inappropriate.

We claim:

1. A magnetic recording medium comprising a support having a magnetic layer on a first side of said support and a back coat layer on a second side of said support which second side is opposite said first side, said back coat layer containing at east a silicon-modified polyurethane and a carbon black having a BET value of from 200 to 500 m²/g, said silicon-modified polyurethane being obtained by the reaction of an isocyanate and an active hydrogen compound having a siloxane linkage.

2. The magnetic recording medium of claim 1, wherein said silicon-modified polyurethane is a polymer obtained by the reaction of an isocyanate with a polysiloxane diol having the following Formula [I]:

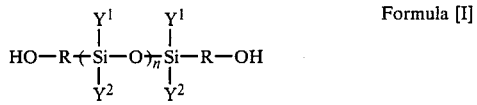

Formula [I]

wherein R is an alkylene radical having from 1 to 20 carbon atoms; $Y^1$ and $Y^2$ each is an alkyl radical or an aryl radical, said $Y^1$ and $Y^2$ being allowed to be the same as or different from each other; and n is such a real number as to cause the average molecular weight of said compound having Formula [I] to be from 150 to 10,000.

3. The magnetic recording medium of claim 2, wherein, in said Formula [I], said alkyl radical represented by each of said $Y^1$ and $Y^2$ is methyl radical, and said aryl radical represented by each of said $Y^1$ and $Y^2$ is phenyl radical.

4. The magnetic recording medium of claim 2, wherein said alkyl radical represented by each of said $Y^1$ and $Y^2$ in said Formula [I] is methyl radical.

5. The magnetic recording medium of claim 2, wherein said polysiloxane diol has a molecular weight of from 1,000 to 6,000.

6. The magnetic recording medium of claim 1, wherein said silicon-modified polyurethane is one that is produced from said polysiloxane diol and said isocyanate in such proportional quantities that the total number of the active hydrogen radicals of the former and the number of the radicals of the latter are in a proportion of 1 to 0.85–1.1.

7. The magnetic recording medium of claim 1, wherein said silicon-modified polyurethane is one that is produced from said polysiloxane diol and said isocyanate in such a proportional relation that the total number of active hydrogen radicals of said polysiloxane diol and a chain elongating agent or of said polysiloxane diol and a cross-linking agent and the number of said isocyanate radicals are in a proportion of 1 to 0.85–1.1.

8. The magnetic recording medium of claim 1, wherein said silicon-modified polyurethane has an average molecular weight of from 5,000 to 200,000.

9. The magnetic recording medium of claim 1, wherein said silicon-modified polyurethane contains from 5 to 25% by weight of a siloxane linkage-having active hydrogen compound in the part formed by active hydrogen compounds that react with said isocyanate.

10. The magnetic recording medium of claim 1, wherein said backcoat layer-provided side has a coefficient of friction of from 0.19 to 0.30.

11. The magnetic recording medium of claim 1, wherein said backcoat layer uses said silicon-modified polyurethane and a different binder in a proportion of from 25:75 to 75:25.

12. The magnetic recording medium of claim 1, wherein said backcoat layer contains as the binder thereof a cellulose-type resin and/or a vinyl chloride-type copolymer or a polyester resin, aside from said silicon-modified polyurethane.

13. The magnetic recording medium of claim 12, wherein said cellulose-type resin contained as the binder of said backcoat layer is nitrocellulose.

14. The magnetic recording medium of claim 13, wherein said nitrocellulose contained as the binder of said backcoat layer has a viscosity of from 1 to ½ second.

15. The magnetic recording medium of claim 12, wherein said vinyl chloride-type copolymer contained as the binder of said backcoat layer has a polymerization degree of from 100 to 600.

16. The magnetic recording medium of claim 12, wherein said vinyl chloride-type copolymer contained as the binder of said backcoat layer is a copolymer containing a partially hydrolyzed vinyl chloride-vinyl acetate component.

17. The magnetic recording medium of claim 12, wherein said vinyl chloride-type copolymer and said cellulose-type resin contained as the binder of said backcoat layer are in a proportion of from 80:20 to 10:90.

18. The magnetic recording medium of claim 12, wherein said silicon-modified polyurethane and said different resins to be contained as the binder materials of said backcoat layer are used in a proportion by weight of from 60:40 to 40:60.

19. The magnetic recording medium of claim 12, wherein said silicon-modified polyurethane is contained in combination with said cellulose-type resin and said vinyl chloride-type copolymer as the binder materials of said backcoat layer.

20. The magnetic recording medium of claim 1, wherein said backcoat layer has a surface electric resistance of not more than $10^8$ Ω.cm.

21. The magnetic recording medium of claim 1, wherein said backcoat layer has a thickness of from 0.5μ to 2.0μ.

22. The magnetic recording medium of claim 21, wherein said carbon black to be incorporated in said backcoat layer is added in the quantity range of from 10 to 25% by weight to said binder.

23. The magnetic recording medium of claim 1, wherein said magnetic layer contains as the binder thereof a thermosetting resin or a reactive-type resin which will not be softened nor fused until it is thermally decomposed.

24. The magnetic recording medium of claim 1, wherein said magnetic layer comprises a magnetic powdery material and a binder, the mixing proportion of which is from 10 to 50 parts by weight of said binder to 100 parts by weight of said magnetic powdery material.

25. The magnetic recording medium of claim 1, wherein said magnetic layer contains an aromatic isocyanate or an addition product of said aromatic isocyanate with an active hydrogen compound which is an isocyanate whose average molecular weight is in the range of from 100 to 3,000.

26. The magnetic recording medium of claim 1, wherein said magnetic layer contains an aliphatic isocyanate or an addition product of said aliphatic isocyanate with an active hydrogen compound which is an isocyanate whose average molecular weight is in the range of from 100 to 3,000.

27. The magnetic recording medium of claim 1, wherein said support has a thickness of from 5 to 50μ in the tape or sheet form.